(12) United States Patent
Serichol Blasco

(10) Patent No.: US 6,892,288 B2
(45) Date of Patent: May 10, 2005

(54) SYSTEM FOR MAKING AUTOMATIC BACKUP COPIES OF COMPUTER FILES WHEN A PERSONAL COMPUTER IS SWITCHED OFF

(76) Inventor: José Maria Serichol Blasco, Cervantes, 1° dcha, 50070 Zaragoza (ES)

( * ) Notice: Subject to any disclaimer, the term of this patent is extended or adjusted under 35 U.S.C. 154(b) by 209 days.

(21) Appl. No.: 10/079,258

(22) Filed: Feb. 19, 2002

(65) Prior Publication Data

US 2002/0124147 A1 Sep. 5, 2002

(30) Foreign Application Priority Data

Feb. 20, 2001 (ES) .......................................... 200100378

(51) Int. Cl.⁷ ............................................. G06F 12/00
(52) U.S. Cl. ....................... 711/161; 711/161; 711/162; 711/114; 714/6; 714/22; 714/24; 707/200; 707/204
(58) Field of Search ........................ 711/161–162, 114, 711/111–112, 115, 3, 113, 173, 118; 707/200, 204, 202; 713/176; 714/22, 24, 6, 15, 8, 7, 1

(56) References Cited

U.S. PATENT DOCUMENTS

| | | | | |
|---|---|---|---|---|
| 5,276,865 A | * | 1/1994 | Thorpe | ........................ 714/24 |
| 5,659,614 A | * | 8/1997 | Bailey, III | ................... 713/165 |
| 5,758,067 A | * | 5/1998 | Makinen et al. | ............... 714/54 |
| 6,038,665 A | * | 3/2000 | Bolt et al. | ................... 713/176 |
| 6,070,247 A | * | 5/2000 | Wallace et al. | ............. 713/300 |
| 6,163,847 A | * | 12/2000 | Yoon et al. | ................... 713/320 |
| 6,263,454 B1 | * | 7/2001 | Gold et al. | .................... 714/25 |
| 6,574,733 B1 | * | 6/2003 | Langford | .................... 713/194 |
| 6,611,850 B1 | * | 8/2003 | Shen | .......................... 707/204 |
| 6,708,291 B1 | * | 3/2004 | Kidder | ........................ 714/39 |
| 2003/0050940 A1 | * | 3/2003 | Robinson | .................... 707/204 |

FOREIGN PATENT DOCUMENTS

| | | | | | |
|---|---|---|---|---|---|
| JP | | 11265264 A | * | 9/1999 | ............. G06F/3/06 |
| WO | WO | 9519002 A1 | * | 7/1995 | ........... G06F/11/14 |

* cited by examiner

Primary Examiner—Matthew Anderson
Assistant Examiner—Zhuo H. Li
(74) Attorney, Agent, or Firm—Collard & Roe, P.C.

(57) ABSTRACT

A system for making automatic backup copies of files when a personal computer is switched off, comprises at least one personal computer, an internal or external storage unit, a principal power relay and configurable control software. The system runs a configurable backup of selected files from the computer's hard drive to the storage unit, after which the computer is switched off by cutting power to the power relay. The control software is accessed by means of a user code, which is also being required to restore encrypted backup copies.

7 Claims, 1 Drawing Sheet

SYSTEM FOR MAKING AUTOMATIC BACKUP COPIES OF COMPUTER FILES WHEN A PERSONAL COMPUTER IS SWITCHED OFF

BACKGROUND OF THE INVENTION

1. Field of the Invention

This invention refers to an automatic system for making backup copies of computer files when a personal computer is switched off, which can be used to make automatic backup copies when the computer is switched off.

2. The Prior Art

The use of computers, especially personal computers, is widespread today. These computers use binary files which, if corrupted, or in the event of a failure of the equipment where they are stored, can lead to a loss of valuable information which sometimes cannot be replaced, leading to economic consequences.

To avoid mishaps of this kind, modern computers are equipped with storage units to make copies of valuable files. These units include streamer tapes, high capacity storage disks with writable CD ROMS, etc.

However, to make backup copies using these units requires the user's intervention before switching off the computer, thus obliging the user to wait until the backup copy has been made before actually switching off the computer.

SUMMARY OF THE INVENTION

It is therefore an object of the invention to provide a backup system that automatically backs up the files when the computer is switched off.

The construction and use of the system referred to in this invention allows a backup copy of user and system files to be made when the personal computer is switched off. With this system, the user need not wait around for the backup to finish in order to switch off the computer, since both the backup itself and the switching off of the computer are automatic.

The system comprises a personal computer, an internal or external backup unit with sufficient capacity, a main power relay and control software. When the order is given to disconnect the system, the control software automatically runs a configurable copy of the files selected by the user from the hard drive to the storage unit.

The files copied may be selected individually by the user. All files on the hard drive(s) may be copied if there is enough room on the storage unit, and the backup unit saves the user's selection for future backups.

A security code guarantees that the user is the only one who can change the configurable parameters of the system operation (files to be copied, storage where the copies are to be stored, etc.) This code is also required to abort backup processes and to restore the copied files, since the backup is encrypted.

If an error occurs during the backup, the program generates warnings, indicating the cause of the error. In this case, the computer may or may not shut down, depending on how it has been configured by the user.

When the backup process is complete, the computer is switched off by means of a principal power relay controlled by a system module or by a disconnection device built into the computer and controlled by commercial software such as an ATX board or Windows operating system.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

DETAILED DESCRIPTION OF THE PREFERRED EMBODIMENT

Figure 1:
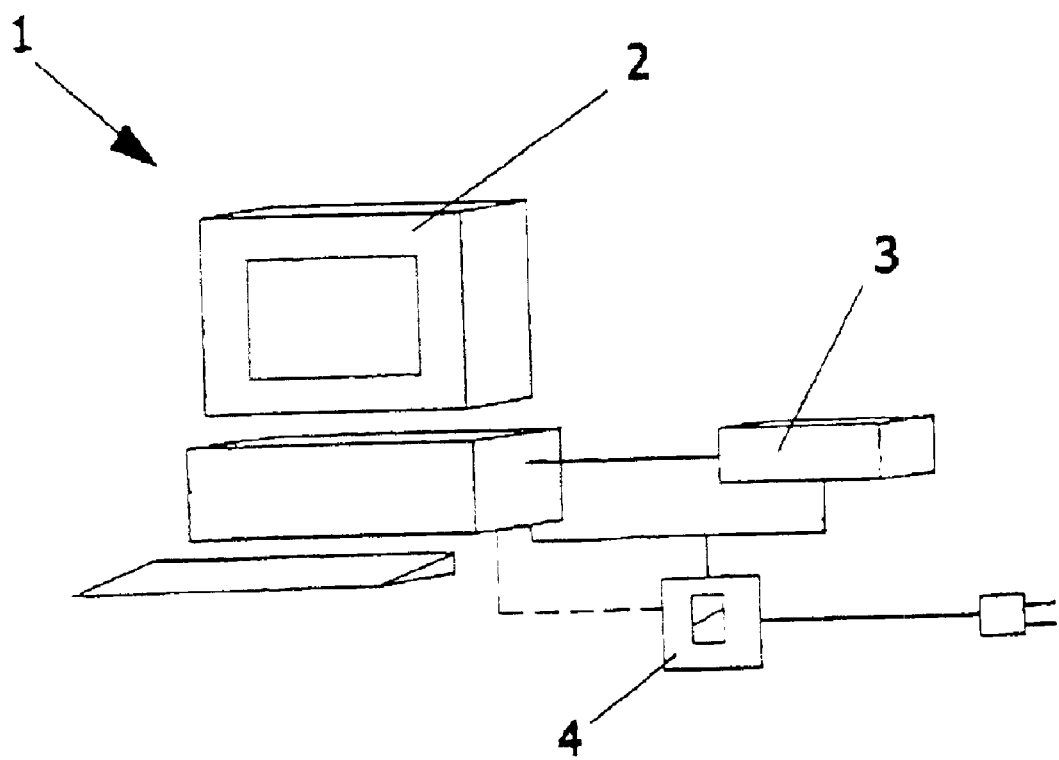
FIG. 1 shows a block diagram of the system according to the invention.

Referring now in detail to the drawing, FIG. 1 shows the system 1 comprised of a personal computer 2, an external storage unit 3 such as a streamer, a principal relay 4 and configurable control software.

When a command is given for the computer to be switched off, the system runs a backup of some or all of the files on the hard drives(s) depending on the selection parameters, to the backup unit chosen by the user. When the backup is complete, the system is disconnected by means of relay 4.

By means of a user code, the system software prevents the configuration parameters from being changed by anyone other than the user. The code must also be entered to abort a backup process and to restore the backup files which are encrypted.

Accordingly, while only a single embodiment of the present invention has been shown and described, it is obvious that many changes and modifications may be made thereunto without departing from the spirit and scope of the invention.

What is claimed is:

1. A system for making automatic backup copies of selected files stored in a hard drive of at least one computer and storing said copies in a storage unit connected to said computer, wherein a configurable control software is installed in the hard drive, wherein said control software includes a backup software and wherein when a user interacts with the computer and generates a command for the computer to be switched off, the control software detects the command and automatically runs the backup software for making the configurable backup copies of selected files from the computer's hard drive to the storage unit, after which the control software switches off the computer by cutting power via a disconnection device.

2. A system according to claim 1, wherein the disconnection device is a power relay.

3. A system according to claim 1, wherein the disconnection device is built into the computer and controlled by software.

4. A system according to claim 1, wherein the backup copies are encrypted.

5. A system according to claim 1, wherein the control software is accessed by means of a user security code.

6. A system according to claim 5, wherein the user security code is required to restore the encrypted backup copies.

7. A method for making automatic backup copies of selected files stored in a hard drive of at least one computer and storing said files in a storage unit connected to said computer, wherein a configurable control software is installed in the hard drive, and wherein said control software includes backup software, the method comprising the following steps:

(a) generating a command via a user for the computer to be shut off;

(b) detecting the command via the control software, and automatically running the backup software upon detection of the command;

(c) making configurable backup copies of selected files from the computer's hard drive via the backup software and storing said copies in the storage unit; and (d) detecting when the backup copies are completed and automatically switching off the computer via a disconnection device.

* * * * *